United States Patent
Aher et al.

(10) Patent No.: US 11,527,234 B2
(45) Date of Patent: Dec. 13, 2022

(54) METHOD AND APPARATUS FOR GENERATING HINT WORDS FOR AUTOMATED SPEECH RECOGNITION

(71) Applicant: Rovi Guides, Inc., San Jose, CA (US)

(72) Inventors: Ankur Aher, Maharashtra (IN); Jeffry Copps Robert Jose, Tamil Nadu (IN)

(73) Assignee: ROVI GUIDES, INC., San Jose, CA (US)

( * ) Notice: Subject to any disclaimer, the term of this patent is extended or adjusted under 35 U.S.C. 154(b) by 382 days.

(21) Appl. No.: 16/590,243

(22) Filed: Oct. 1, 2019

(65) Prior Publication Data

US 2021/0097977 A1    Apr. 1, 2021

(51) Int. Cl.
*G10L 15/08*    (2006.01)
*G10L 15/02*    (2006.01)
*G10L 15/22*    (2006.01)

(52) U.S. Cl.
CPC ............ *G10L 15/02* (2013.01); *G10L 15/22* (2013.01); *G10L 2015/025* (2013.01); *G10L 2015/223* (2013.01)

(58) Field of Classification Search
USPC ................ 382/155–160, 190–195, 224–231; 704/1–10, 200–278
See application file for complete search history.

(56) References Cited

U.S. PATENT DOCUMENTS

| | | | |
|---|---|---|---|
| 7,499,914 B2* | 3/2009 | Diab | G06F 16/9032 707/999.005 |
| 10,311,860 B2* | 6/2019 | Aleksic | G10L 15/197 |
| 10,769,143 B1* | 9/2020 | Van Rotterdam | G06F 16/282 |
| 2012/0059813 A1* | 3/2012 | Sejnoha | G06F 16/951 707/707 |
| 2013/0173255 A1 | 7/2013 | Ehsani et al. | |
| 2014/0040275 A1 | 2/2014 | Dang et al. | |
| 2014/0163968 A1 | 6/2014 | Ehsani et al. | |
| 2016/0078860 A1* | 3/2016 | Paulik | G10L 15/197 704/244 |
| 2016/0350320 A1 | 12/2016 | Sung et al. | |
| 2017/0125011 A1 | 5/2017 | Shu | |
| 2019/0251972 A1* | 8/2019 | Li | G06F 40/216 |
| 2020/0193092 A1 | 6/2020 | Seow et al. | |

OTHER PUBLICATIONS

European Extended Search Report for European Application No. 20199706.1, dated Feb. 24, 2021 (6 pages).
U.S. Appl. No. 16/590,244, filed Oct. 1, 2019, Ankur Aher.

* cited by examiner

*Primary Examiner* — Marcellus J Augustin
(74) *Attorney, Agent, or Firm* — Haley Guiliano LLP

(57) ABSTRACT

Systems and methods for determining hint words that improve the accuracy of automated speech recognition (ASR) systems. Hint words are determined in the context of a user issuing voice commands in connection with a voice interface system. Terms are initially taken from most frequently occurring terms in operation of a voice interface system. For example, most frequently occurring terms that arise in electronic search queries or received commands are selected. Certain of these terms are selected as hint words, and the selected hint words are then transmitted to an ASR system to assist in translation of speech to text.

19 Claims, 9 Drawing Sheets

ASR without Hints :

ASR with Hints :

Hints based on:
- Frequency of words reflecting user behavior
- Search query context

| WORD | FREQUENCY |
|---|---|
| HBO | 3211 |
| Volume | 2699 |
| Tom Cruise | 1542 |
| Suits | 1322 |
| ... | ... |

FIG. 10

| TIME FRAME | WORD | FREQUENCY |
|---|---|---|
| 0 UTC – 1 UTC | Netflix | 321 |
|  | Play | 199 |
|  | Sacred Games | 122 |
|  | ... | ... |
| 1 UTC – 2 UTC | HBO | 311 |
|  | Volume | 219 |
|  | Marvel | 142 |
|  | ... | ... |
| 2 UTC – 3 UTC | Channel | 114 |
|  | Volume | 99 |
|  | Tom Cruise | 42 |
|  | ... | ... |
| ... | ... | ... |

FIG. 11

METHOD AND APPARATUS FOR GENERATING HINT WORDS FOR AUTOMATED SPEECH RECOGNITION

BACKGROUND

Embodiments of the disclosure relate generally to automated speech recognition. More specifically, embodiments of the disclosure relate to generating hint words for automated speech recognition.

SUMMARY

Recent technological advances have allowed the somewhat widespread use of automated speech recognition (ASR) tools, by which computing devices convert speech to text without human intervention. ASR tools have proven useful in numerous applications, including voice user interfaces that rely on speech to text tools to convert spoken commands to text that can be interpreted, and speech to text processing that allows people to perform word processing tasks without typing.

ASR currently suffers from significant limitations, however. Unassisted ASR tools often suffer from limited accuracy. In particular, ASR systems often have difficulty when dealing with words that sound identical or similar yet have different meanings such as "meet" and "meat", difficult to pronounce words that are often spoken incorrectly to the ASR tool, mispronounced words, and noise in the speech input signal. These and other factors result in decreased accuracy of the ASR system and user frustration.

Accordingly, to overcome the lack of accuracy in ASR systems, systems and methods are described herein for a computer-based process that generates hint words to assist in the automated speech recognition process. The use of hint words, or additional words input to the ASR system along with speech input, helps provide context for the spoken words and thus increases accuracy. Embodiments of the disclosure describe improvements in the determination of hint words, which thus results in increased accuracy of ASR systems.

In one embodiment, it is noted that speech to text operations are at times carried out in relation to the use of a voice interface system. More specifically, users of voice interface systems may issue voice queries or commands to initiate various operations such as conduct an electronic search for information, purchase one or more products, direct the operation of various electronic devices, and the like. ASR systems interpreting these voice commands are aided by contextual information, which can be determined from prior operation of the voice interface system. Accordingly, hint words are taken from terms that have arisen during operation of the voice interface system. This provides valuable context information for voice commands issued in connection with use of the voice interface system, thus improving the accuracy of any speech to text operations. These terms can be any terms of search queries spoken to the voice interface system, or any terms of commands uttered to the system. Terms can also be any other word or phrase, including terms such as names of consumer goods, tasks, reminders, calendar items, dates, or items of a list of items, as many of these may be uttered to voice interface systems.

As one example, hint words for voice queries issued in connection with a voice interface system can be determined according to the most frequently occurring terms arising in operation of this voice interface system. These terms can be determined from any such operation. For example, terms can be selected from electronic search queries issued through the voice interface system. Terms can also be taken from commands issued through or to the voice interface system. These terms, or some subset thereof, can be selected as hint words for transmission to, and use by, an ASR application.

Hint words can be taken from this set of terms in any manner. As one example, a predetermined number of the most frequently occurring terms may be selected as the hint words. For instance, the top 50, 100, or 1000 most frequently occurring terms may be used as hint words. As another example, hint words can be taken from a predetermined number of the terms that occur most frequently during some predetermined time period. Alternatively, a combination of the above two examples may be used to determine hint words. That is, a predetermined number of the most frequently occurring terms, and a predetermined number of the most frequently occurring terms over some particular time period, can be used as the hint words. In another embodiment, common terms between the most frequently occurring terms and the most frequently occurring terms over a particular time period can be used as hint words.

Selecting hint words from those terms common to the set of most frequently occurring terms, and the set of most frequently occurring terms over a particular time period, may result in an insufficient number of terms, as these two sets may sometimes have few terms in common. Thus, additional terms may be further selected as hint words. In particular, if less than some predetermined number of terms are common to both sets, additional terms can be selected from the set of most frequently occurring terms, to take the total number of hint words up to the predetermined number. That is, additional terms can be picked from those terms of the first set that are not common to the second set, until the total number of terms reaches the predetermined number. These additional terms can be selected from the first set in any manner, such as in order of most frequent occurrence.

In the alternative, additional terms can be picked from the second set rather than the first set. That is, additional terms can be picked from the set of most frequently occurring terms over a particular time period, until the total number of terms reaches the predetermined number. In this case, additional terms can be taken from those members of the second set that are not common to the first set, in order of most frequent occurrence or in any other order.

As described above, some embodiments may select terms from one or more of terms of electronic search queries, or commands spoken. It is noted, though, that this is not an exhaustive list, and terms may be selected from other sources. For example, terms may be selected from some predetermined number of the most recent electronic search queries, or terms of some predetermined number of commands most recently issued. As another example, phonemes or phonetic neighbors of any terms may also be used as hint words.

In another embodiment, hint words may be determined using a graph data structure. More specifically, terms can be taken from a predetermined number of recent electronic searches. A graph of terms may then be consulted. This graph is a graph data structure which may be constructed from any group of terms. Each term taken from the electronic searches can be compared to the graph. For each such term that appears in the graph, all proximate (e.g., neighboring) terms can be selected. The sets of all such proximate terms can then be compared to each other. Terms common to each of these sets can be hint words. These hint words can then be transmitted to an ASR application to assist in converting voice commands or other speech to text.

The graph can be any graph of terms. As one example, the graph can be constructed from a set of entertainment terms, or any other group of terms that are likely to appear in the context of, e.g., a voice interface system.

Any proximate terms can be selected. For example, terms can be selected in order of proximity. In one such embodiment, nearest connected terms can be selected first and, if an insufficient number of nearest terms exists, next-nearest connected terms can also be selected, with this process repeating until a sufficient number of terms have been selected for use as hint words.

Common terms may also be selected in any manner. For instance, terms common to every group of proximate terms may be selected as hint words. If this results in an insufficient number of hint words, one group of proximate terms may be removed, and terms common to every remaining group of proximate terms may be selected as additional hint words. If the total number of hint words remains insufficient, this process may be repeated with successive groups of proximate terms removed, with terms common to the remaining groups of proximate terms also selected as hint words, until a sufficient number of hint words has been selected.

Each term may be a single word, i.e., a natural language word, or may be a collection of words such as a natural language phrase.

Hint words may be taken from proximate terms on a graph. These proximate terms may be any other words associated with the terms in some manner. Thus, for example, hint words may include phonemes of the terms selected, as well as phonetic neighbors of those terms.

It is also noted that the number of search queries considered, and the number of proximate terms, may be the same number or different numbers.

It is noted that embodiments of the disclosure are not limited to voice interface systems, and encompass any system employing hint words. For example, embodiments of the disclosure may be employed in connection with content display systems such as media guides. In particular, media guides that employ voice interfaces allow users to search for and select content via voice commands. When such content display systems are used, terms can be taken from search terms, the titles of content played by the display system, from titles of content the user has liked or otherwise indicated as his or her favored content, or from terms of content that the user has disliked in some manner.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIGS. 10-11 are tables illustrating word frequencies, for selection of terms in accordance with embodiments of the disclosure.

DETAILED DESCRIPTION

In one embodiment, the disclosure relates to systems and methods for determining hint words that improve the accuracy of ASR systems. Hint words are determined in the context of a user issuing voice commands in connection with a voice interface system. Terms are initially taken from most frequently occurring terms arising in operation of a voice interface system. For example, most frequently occurring terms that arise in electronic search queries or user-issued commands are selected. Certain of these terms are selected as hint words, and the selected hint words are then transmitted to an ASR system to assist in translation of speech to text. Selection of terms as hint words may be accomplished according to any criteria and in any manner. For example, a certain number of the most frequently occurring terms may be selected as hint words. As another example, a specified number of the terms that occur most frequently in some predetermined time period may be selected as hint words. Hint words may be selected in various other ways as well.

Figure 1:
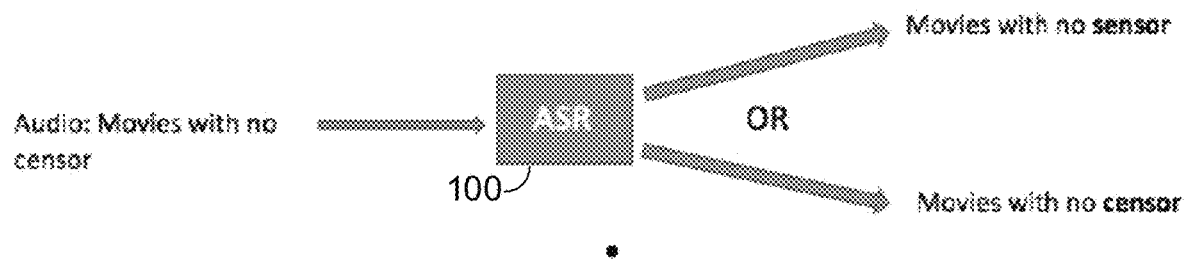
FIG. 1 illustrates operation of an ASR system without hint words, and operation of an ASR system with hint words determined in accordance with embodiments of the disclosure.
Figure 1:
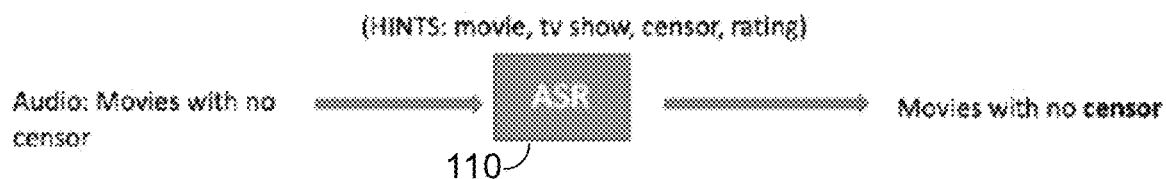

FIG. 1 illustrates operation of an ASR system without hint words, and operation of an ASR system with hint words determined in accordance with embodiments of the disclosure. Here, an ASR system 100, which can be any ASR system implementing any speech to text methods and processes, receives an audio signal as input and outputs a corresponding text translation of the audio signal. In this case, the input audio signal is an audio recording of the spoken statement "Movies with no censor." The output may be either the text "Movies with no sensor" or "Movies with no censor." As the ASR module 100 does not receive any context information, it cannot distinguish between two different words that sound identical. That is, the ASR module 100 correctly notes that the sequence of sounds it receives for the spoken term "censor" can be the text word "censor" or the text word "sensor," and without any knowledge of the context of the input sentence, it cannot reliably determine which of the two is correct.

In contrast, ASR module 110 receives both an input audio signal and a set of hint words. These hint words provide context information to the ASR module 110 that was missing from the input to previous ASR module 100. In particular, the hint words "movie," "tv show," "censor," and "rating" indicate an entertainment-related context for the input audio signal. That is, the terms or words of the input audio signal may be entertainment-related. Thus, the ASR module 110 selects the term "censor" as being within the context of the input audio signal, rather than the term "sensor" which is unrelated to entertainment. Accordingly, ASR module 110 utilizes input hint words to select the correct translation "Movies with no censor" rather than the incorrect "Movies with no sensor."

The hint words input to ASR module 110 can be any terms, i.e., any one or more words, that provide an accurate context for an input audio or speech signal. As an example, hint words can be taken from frequent words used by a user or reflecting his or her behavior, e.g., words from electronic searches the user initiates, or words the user frequently utters when issuing voice commands to his or her voice interface system.

Figure 2:
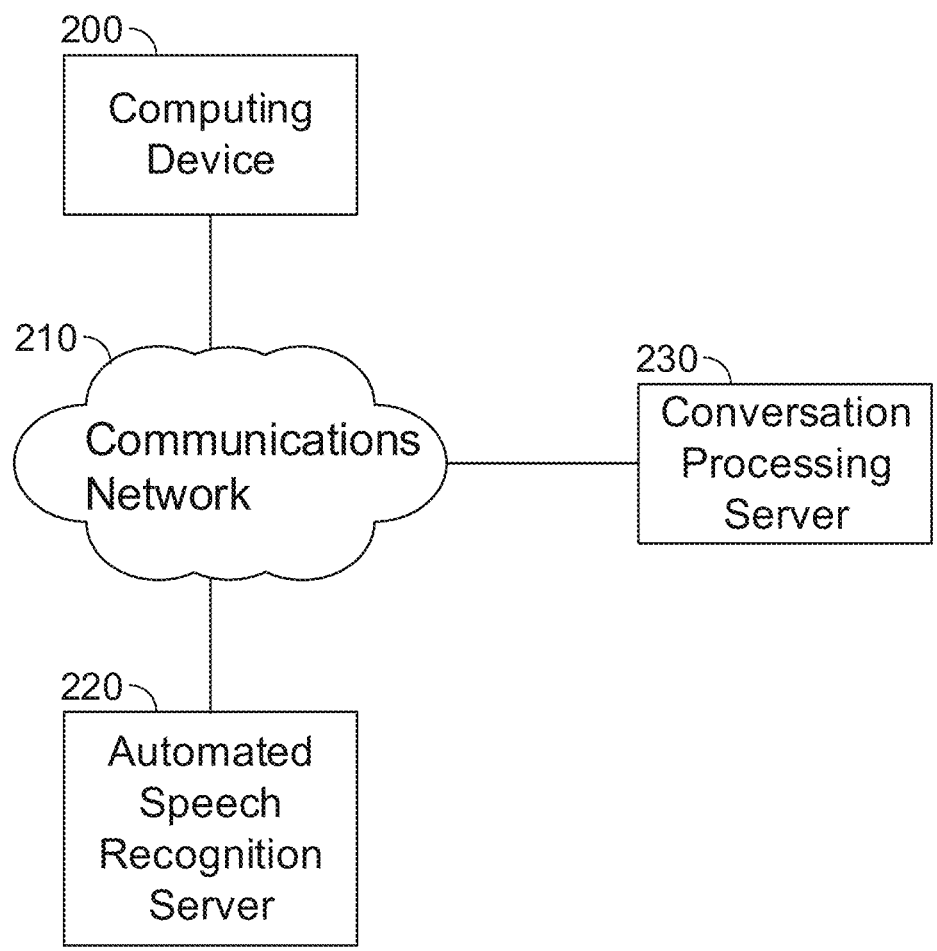
FIG. 2 is a block diagram illustration of a system for implementing processes of hint word determination in accordance with embodiments of the disclosure.

FIG. 2 is a block diagram illustration of a system for implementing processes of hint word determination in accordance with embodiments of the disclosure. A computing device 200 may be in communication with an ASR server 220 through, for example, a communications network 210. ASR server 220 is also in electronic communication with conversation processing server 230 also through, for example, the communications network 210. Computing device 200 may be any computing device running a user interface, such as a voice assistant, voice interface allowing for voice-based communication with a user, or an electronic content display system for a user. Examples of such computing devices are a smart home assistant similar to a Google Home® device or an Amazon® Alexa® or Echo® device, a smartphone or laptop computer with a voice interface application for receiving and broadcasting information in voice format, a set-top box or television running a media guide program or other content display program for a user, or a server executing a content display application for generating content for display to a user. ASR server 220 may be any server running an ASR application. Conversation processing server 230 may be any server programmed to determine hint words in accordance with embodiments of the disclosure, and to transmit the hint words to the ASR server 220. For example, conversation processing server 230 may be a server programmed to determine hint words by retrieving terms entered into computing device 200 when the user is operating device 200 to view content.

Figure 3:
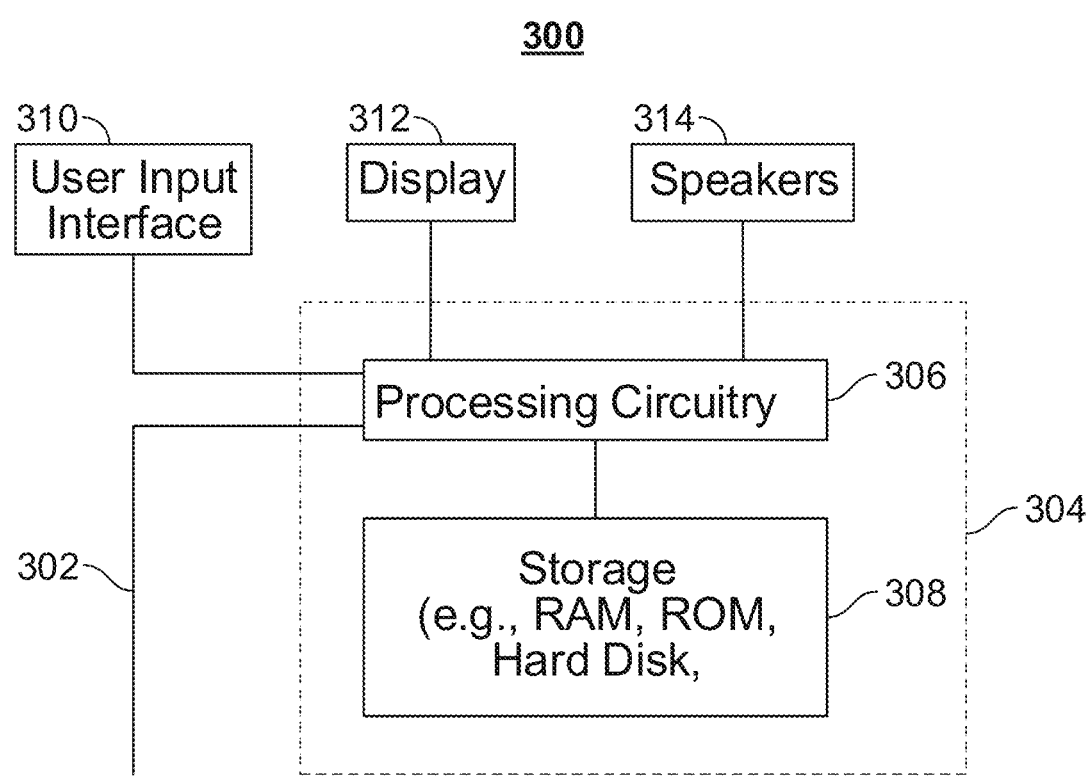
FIG. 3 is a generalized embodiment of illustrative electronic computing devices constructed for use according to embodiments of the disclosure.

The computing device 200, e.g., device 100, may be any device capable of acting as a voice interface system such as by running one or more application programs implementing voice-based communication with a user, and engaging in electronic communication with server 230. For example, computing device 200 may be a voice assistant, smart home assistant, digital TV, laptop computer, smartphone, tablet computer, or the like. FIG. 3 shows a generalized embodiment of an illustrative user equipment device 300 that may serve as a computing device 200. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers to stream and display content on display 312.

Control circuitry 304 may thus include communications circuitry suitable for communicating with a content provider 140 server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user. The application programs can include one or more voice interface applications for implementing voice communication with a user, and/or content display applications which implement an interface allowing users to select and display content on display 312 or another display.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
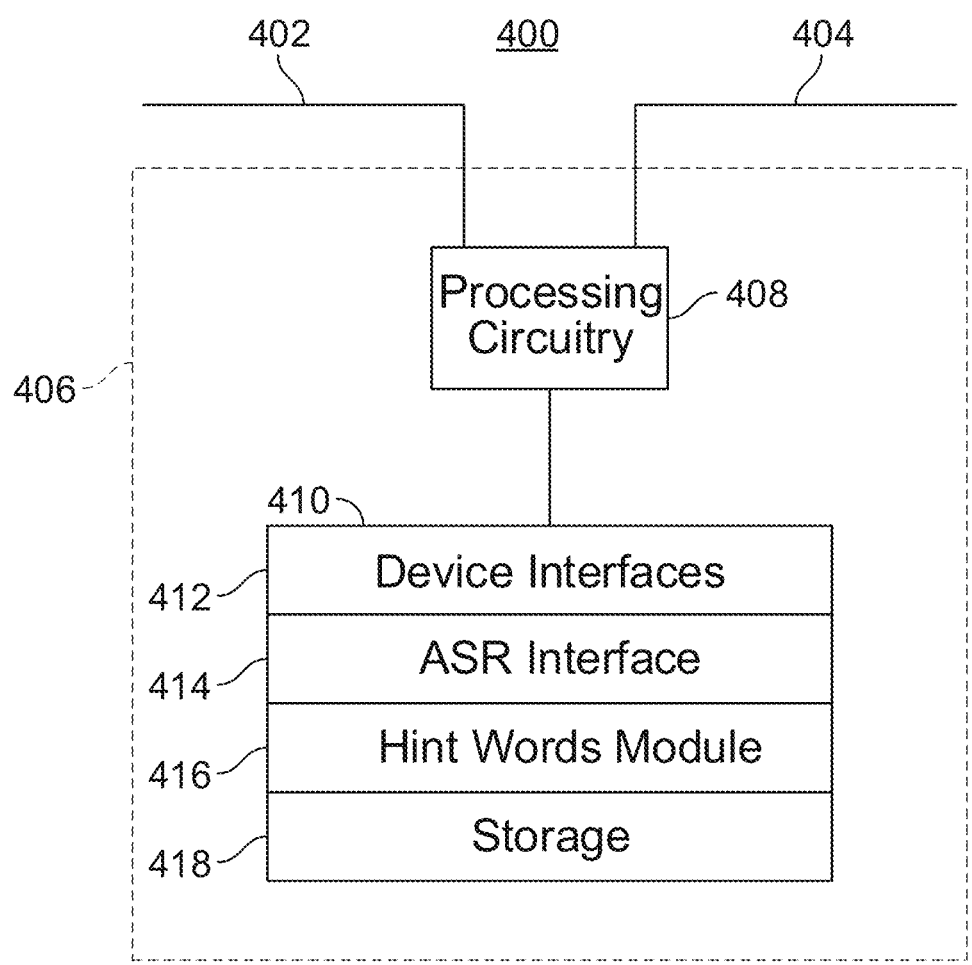
FIG. 4 is a generalized embodiment of an illustrative conversation processing server constructed for use according to embodiments of the disclosure.

FIG. 4 is a generalized embodiment of an illustrative conversation processing server 230 constructed for use according to embodiments of the disclosure. Here, device 400 may serve as a conversation processing server. Device 400 may receive content and data via I/O paths 402 and 404. I/O path 402 may provide content and data to the various content consumption devices 110 and 130, while I/O path 404 may provide data to, and receive content from, one or more content providers 140. Like the user equipment device 300, the device 400 has control circuitry 406 which includes processing circuitry 408 and storage 410. The control circuitry 406, processing circuitry 408, and storage 410 may be constructed, and may operate, in similar manner to the respective components of user equipment device 300.

Storage 410 is a memory that stores a number of programs for execution by processing circuitry 408. In particular, storage 410 may store a number of device interfaces 412, an ASR interface 414, hint words module 416 for retrieving terms from device 200 and selecting hint words therefrom, and storage 418. The device interfaces 412 are interface programs for handling the exchange of commands and data with the various devices 200. ASR interface 414 is an interface program for handling the exchange of commands with and transmission of hint words to various ASR servers 220. A separate interface 414 may exist for each different ASR server 220 that has its own format for commands or content. Hint words module 416 includes code for executing all of the above described functions for selecting hint words, including retrieving terms from devices 200, selecting hint words therefrom, and sending the selected hint words to ASR interface 414 for transmission to ASR server 220. Storage 418 is memory available for any application, and is available for storage of terms or other data retrieved from device 200, selected hint words, or the like.

The device 400 may be any electronic device capable of electronic communication with other devices and selection of hint words. For example, the device 400 may be a server, or a networked in-home smart device connected to a home modem and thereby to various devices 200. The device 400 may alternatively be a laptop computer or desktop computer configured as above.

ASR server 220 may be any server configured to run an ASR application program, and may be configured similar to server 400 of FIG. 4 with the exception of storing one or more ASR modules in memory 410 rather than device interfaces 412, ASR interface 414, and hint words module 416.

Figure 5:
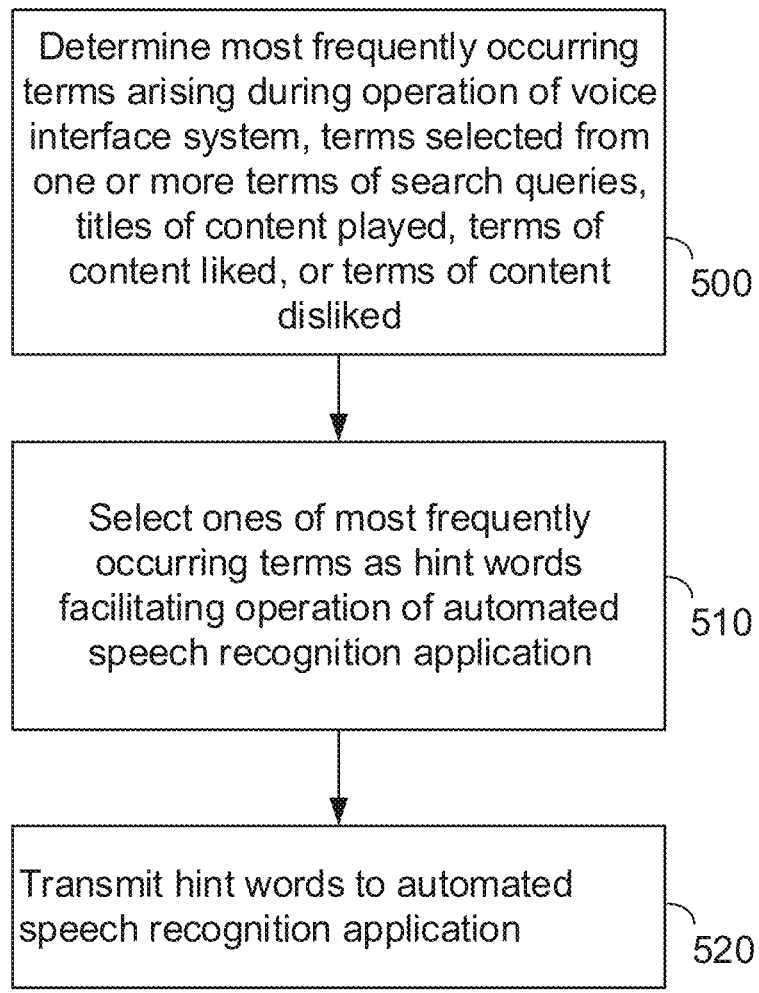
FIGS. 5-7 are flowcharts illustrating process steps for determining hint words for an ASR system, in accordance with embodiments of the disclosure.

FIG. 5 is a flowchart illustrating process steps for determining hint words for an ASR system, in accordance with embodiments of the disclosure. Initially, hint words module 416 determines the most frequently occurring terms arising during operation of a voice interface system on device 200 (Step 500). The terms may arise during any operation of the voice interface system, and can include any terms spoken by a user to the device 200, such as search query terms or command words. Terms can also be any other word or phrase spoken to the voice interface system, including terms such as names of consumer goods, tasks, reminders, calendar items, dates, or items of a list of items. When device 200 implements another interface such as a content display system, terms may for example be those terms entered in search queries executed by the electronic content display system, terms in any titles of content played by the content display system, and any terms of content liked, disliked, or otherwise positively/negatively described through the content display system, as well as any phonetic neighbors, phonemes, synonyms, and the like.

Terms may be sent to the hint words module 416 in any manner. For example, terms may be compiled and transmitted by the device 200, either by its voice interface application or by another application program. Transmission can be performed automatically, or in response to a request from conversation processing server 230. Alternatively, interactions between the user and device 200 may be sent to server 230. For example, device 200 may transmit to server 230 any or all user interactions with its voice interface application, including search queries received, commands issued, or the like. Hint words module 416 may then parse each of these and log each individual term they contain, along with a count of their number of times each term appears. Module 416 may also add any phonetic neighbors, phonemes, synonyms, or the like, which may be assigned the same frequency as their base terms or may be given any other frequency. This log of terms may then be used to determine hint words.

Once the hint words module 416 retrieves and/or determines each term, the most frequently occurring of these terms are selected as hint words (Step 510). That is, the terms most frequently arising in the user's interactions with their voice interface application are deemed likely to provide meaningful context for any voice queries or commands the user may issue for that same voice interface application. Accordingly, such frequently arising terms are deemed good candidates for effective hint words. Selection of frequently arising terms may be performed in any manner, and exemplary selection processes are described further in connection with FIG. 6 below.

The hint words determined in Step 510 are then transmitted to ASR server 220 (Step 520), where they are used to improve the accuracy of speech to text operation. Steps 500-520 may be performed at any one or more times, automatically or in response to any signal. For example, Steps 500-520 may be performed in response to a voice query sent to ASR server 220 by device 200, such as by a signal from device 200 transmitted to server 230 when device 200 sends its voice query to ASR server 220. Alternatively, Steps 500-520 may be performed automatically upon receipt of new terms or user interaction information from device 200. As a further alternative, device 200 may transmit voice queries directly to conversation processing server 230 instead of ASR server 220, and server 230 may forward the query to ASR server 220 along with accompanying hint words after executing Steps 500-520.

Figure 6:
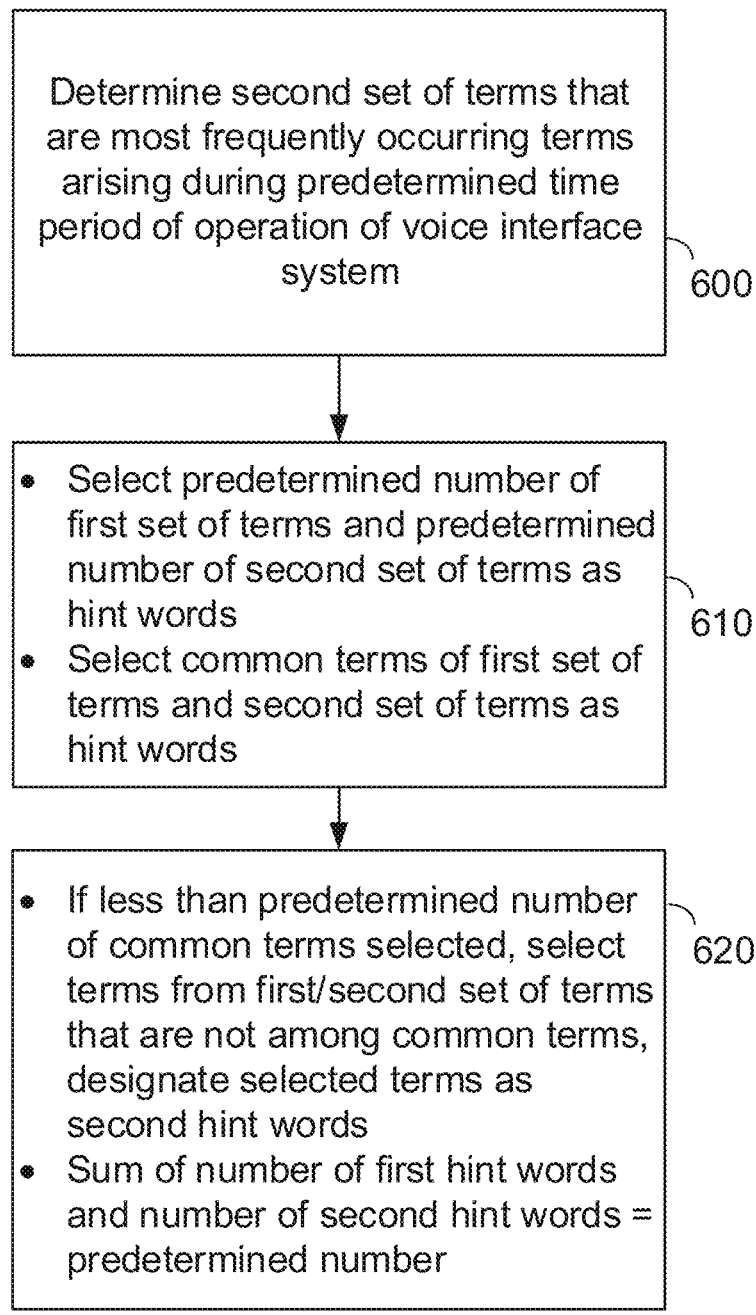

FIG. 6 is a flowchart illustrating further details of hint word selection, in accordance with embodiments of the disclosure. As described above, the hint words may simply be a predetermined number of the most frequently appearing terms logged by server 230 at Step 500. That is, hint words may be taken from the terms most commonly arising in the user's interactions with the voice interface application of his or her device 200. Alternatively, hint words may be taken from the terms most commonly arising in the user's interactions with the voice interface application during a predetermined time period. For example, as above, the hint words module 416 may determine a predetermined number of the most frequently appearing terms. This may be referred to as a first set of terms. Additionally, hint words module 416 may determine a second set of terms which are the most frequently occurring terms arising during a predetermined time period of operation of the display system (Step 600). Here, device 200 transmits not only user interactions with its voice interface application, but also dates and times at which these interactions occur. Hint words module 416 may thus log terms and their frequencies as a function of time, for example by logging only those terms that arise within a predetermined time period such as the past week. That is, hint words module 416 may keep a running log of only those terms whose interaction dates and times fall within, e.g., the past week. Alternatively, hint words module 416 may keep a running log of terms and their interaction dates and times, and filter the log by time to determine only those terms that have arisen within the predetermined time period. The predetermined time period of Step 600 may be any time period, e.g., the past week, the past two weeks, last week, last month, any time period specified by the user whether ongoing or already ended, or the like.

Once this second set of terms is determined, hint words module 416 can select hint words from the first set of terms and the second set of terms as desired (Step 610). Selection can occur from between the first and second sets of terms in any manner. As one example, module 416 may select a predetermined number terms from the first set of terms, and a predetermined number of terms from the second set of terms, and select common terms as hint words. That is, for instance, module 416 may select the 1000 most frequently occurring terms of the first set, and the 1000 most frequently occurring terms of the second set, and only those terms common to each selected group of 1000 terms may be picked as hint words. The hint words may also be selected from the most frequently occurring terms in any other manner, such as by simply using every selected term (excluding duplicates) as hint words. The numbers of terms selected from the first and second sets may be any numbers, and the number of terms selected from each set may vary by set.

If common terms are selected, a situation may arise in which there are insufficient common terms. That is, the set of common terms may be too small a set to act as effective hint words. Thus, if less than some predetermined number of common terms is selected, hint words module 416 may also select terms from among the first and second sets that are not common to both sets, to bring the total number of selected terms up to some predetermined desired number of terms (Step 620). This predetermined desired number may be any number deemed sufficient to provide a corpus of hint words that will be effective in assisting the ASR server 220, e.g., 3000 or any other number. These additional terms may be selected from among the first and second sets in any manner. For example, a predetermined number of terms may be selected from each set to bring the sum total of terms to some desired number, e.g., an equal number of terms may be selected from each set, in order of frequency of occurrence, until the desired total number of terms is reached. Alternatively, term selection may be weighted toward the second set if the second set is a set of terms arising within an ongoing or current time period, as such terms may provide more recent contextual information. The desired number of total terms may be any number.

Figure 7:
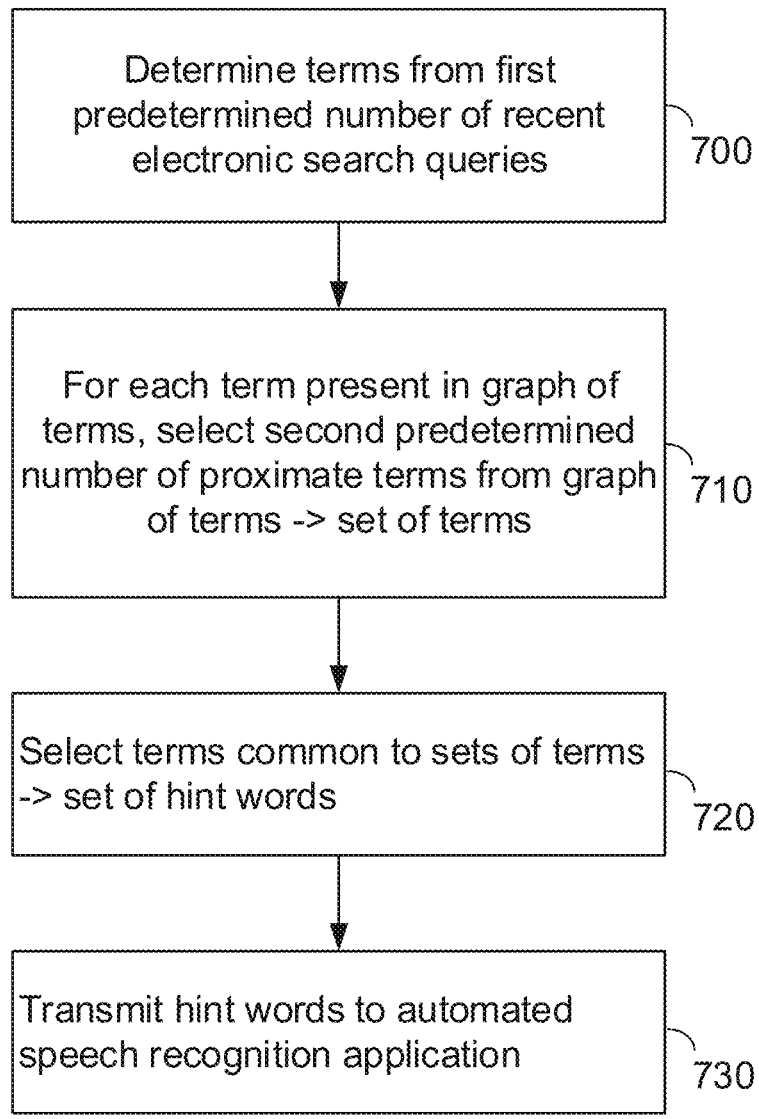

FIG. 7 is a flowchart illustrating process steps for determining hint words for an ASR system, in accordance with further embodiments of the disclosure. Here, hint words are determined with reference to a graph data structure, i.e., a representation of a set of terms, in which terms are interconnected by links. Graphs are known data structures used to represent terms that have some relation to each other. The process of FIG. 7 uses graphs of terms taken from the voice interface application of device 200, to determine a set of hint words. Initially, hint words module 416 determines terms from a first predetermined number of recent electronic search queries entered in connection with the voice interface application of device 200 (Step 700). As above, this Step may be performed in any manner. For example, terms may be compiled and transmitted by the device 200, either by its voice interface application or by another application program. Transmission can be performed automatically, or in response to a request from conversation processing server 230. Alternatively, interactions between the user and device 200 may be sent to server 230. For example, device 200 may transmit to server 230 any or all search queries entered to the voice interface application. Hint words module 416 may then parse each of these and log each individual term they contain, along with a count of their number of times each term appears. Module 416 may also add any phonetic neighbors, phonemes, synonyms, or the like, which may be assigned the same frequency as their base terms or may be given any other frequency. This log of terms may then be used to determine hint words.

The logged terms may then be compared to a graph of terms, i.e., a graph data structure populated with terms such as entertainment-related terms. Such graphs are known. As such, existing graphs may be employed, or graphs may be constructed using known methods from terms such as general entertainment-related terms, known entertainment domain entities such as personalities, programs, channels, genres, etc., terms arising in content genres of interest to the user of device 200, and the like. In such graphs, nodes are entities while edges represent relationships between nodes, e.g., "director of," "episode of," "co-actor," and the like. Graphs may be unweighted, or weighted accordingly to how closely connected nodes are. Thus, such graphs can identify words, phrases or entities in previous queries, determine their closely connected nodes, and include those terms in the list of hint words.

Accordingly, for each logged term that is present in the graph, hint words module 416 may select a predetermined number of proximate terms from the graph of terms (Step 710). That is, hint words module 416 determines a set of proximate terms for each logged term that is also present in the graph. Proximate terms can be any nearby terms in the graph, as described further below.

The hint words module 416 then selects terms common to each set of proximate terms, with these common terms then forming the set of hint words (Step 720). The set of hint words is then transmitted to the ASR server 220 (Step 730) for use in converting speech to text.

Figure 8:
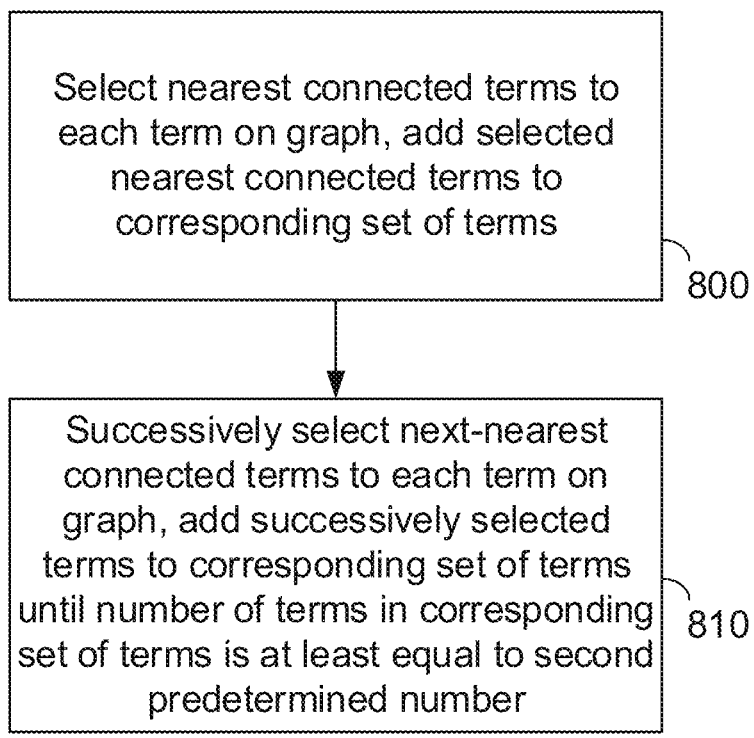
FIGS. 8-9 are flowcharts illustrating further details of process steps for selecting sufficient numbers of hint words, in accordance with embodiments of the disclosure.
Figure 9:
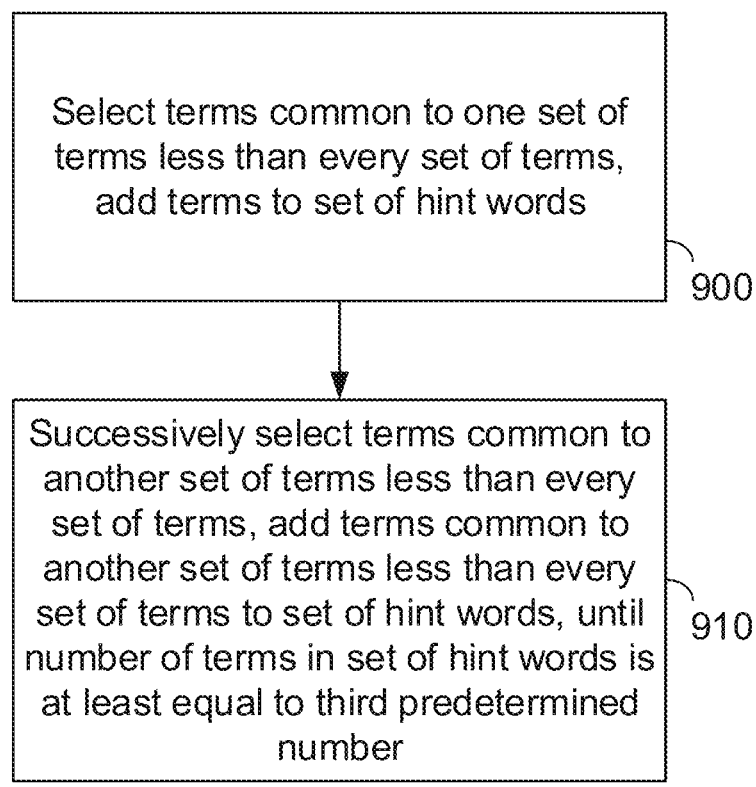

Nearby graph terms are selected for use as hint words in any manner. FIGS. 8-9 are flowcharts illustrating further details of exemplary process steps for selecting nearby terms for use as hint words, in accordance with embodiments of the disclosure. More specifically, FIG. 8 illustrates further details of Step 710 above, as carried out in one embodiment. Here, once terms are determined and logged from device 200, the terms are compared to the graph of terms. For each logged term which also appears in the graph, hint words module 416 selects the nearest connected terms, i.e., terms connected by one edge. The logged term and its nearest connected terms together form a set of terms (Step 800). The number of terms in this set is then compared to a predetermined value and, if the value is greater than the number of terms in the set, the set is too small. Next-nearest connected terms are thus determined, i.e., terms two edges distant, and these terms are added to the set of terms. This process repeats with successively more distantly-connected terms, until the number of terms in the set meets or exceeds the predetermined value (Step 810). The predetermined value may be any value.

The selection of terms common to each set may be accomplished in any manner. FIG. 9 illustrates further details of Step 720 above, as carried out in one embodiment. The embodiment of FIG. 9 contemplates the possibility that there may be too few common terms to serve effectively as hint words. In particular, the number of terms common to every set of proximate terms may be too few to provide context to an ASR program. The process of FIG. 9 thus reduces the number of sets required by one at each step, until sufficient common terms exist. For example, if N sets of proximate terms exist (N logged terms that appear in the graph, and their proximate graph terms), and there are an insufficient number of terms common to all N sets, the hint words module 416 then selects all terms common to N−1 sets and adds those terms to the list of common terms (Step 900), minus duplicates. If insufficient common terms still exist, the hint words module 416 then selects all terms common to N−2 sets and adds those terms to the list of common terms, minus duplicates. This process continues (Step 910) until a sufficient number of common terms exists. This number may be any value. Additionally, sets may be removed in any manner. That is, when the process transitions from examining N sets to examining N−1 sets, the set removed is determined in any manner. For instance, smallest sets may be removed first, largest sets may be removed first, sets with the most/least frequently occurring terms may be removed first, or the like.

FIGS. 10-11 are tables illustrating word frequencies, for selection of terms in accordance with embodiments of the disclosure. As above, once hint words module 416 determines terms from recent electronic search queries as in Step 700, module 416 generates a log of terms. This log allows module 416 to easily determine and retrieve the most frequently occurring terms. FIG. 10 illustrates one such log, showing terms received from device 200 and the number of times each term has arisen in connection with operation of its voice interface application, in order of frequency. This log may be used, for example, to determine hint words in embodiments that consider the most frequently occurring terms as hint word candidates. In contrast, FIG. 11 illustrates another such log, showing terms received and the number of times each term has arisen during a specified time frame. This log may be used, for example, to determine hint words in embodiments that consider the most frequently occurring terms over a specified time frame.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, terms arising during operation of a voice interface or electronic content display system can be determined in any manner, and most frequently occurring ones of these terms may be selected in any quantity. Any combination of most frequently occurring terms and most frequently occurring terms over any time period may be used as hint words. If a graph data structure is employed, the graph can be any configuration of graph, having any terms, whether entertainment-related or otherwise. Also, if common terms are used as hint words, additional terms may be added to the set of common terms in any manner, to bring the total number of terms in the set to any desired number. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of determining hint words for automated speech recognition, the method comprising:
    determining, using processing circuitry, a first set of terms comprising terms that are most frequently occurring terms from operation of a voice interface system, the most frequently occurring terms selected from one or more of terms of queries issued to the voice interface system, or terms of commands issued to the voice interface system;

determining, using the processing circuitry, a second set of terms that are most frequently occurring terms arising during a predetermined time period of operation of the voice interface system;

selecting as a first set of hint words facilitating operation of an automated speech recognition application, the first set of hint words comprising common terms of the first set of terms and the second set of terms;

selecting, if less than a predetermined number of common terms are selected, a second set of hint words comprising a plurality of terms from the first set of terms that are not among the common terms; and transmitting, using the processing circuitry, the first set of hint words and the second set of hint words to the automated speech recognition application.

2. The method of claim 1, wherein the second set of hint words further comprises selecting a predetermined number of most frequently occurring ones of the terms as the hint words.

3. The method of claim 1, wherein the second set of hint words further comprises a first predetermined number of the first set of terms and a second predetermined number of the second set of terms.

4. The method of claim 1,
wherein a sum of the number of first hint words and a number of the second hint words is equal to the predetermined number.

5. The method of claim 1,
wherein the second hint words further comprises one or more terms from the second set of terms that are not among the common terms and
wherein a sum of the number of first hint words and a number of the second hint words is equal to the predetermined number.

6. The method of claim 1, wherein the most frequently occurring terms are selected from one or more of terms of most recent queries issued to the voice interface system, or terms of most recent commands issued to the voice interface system.

7. The method of claim 1, wherein the most frequently occurring terms are selected from one or more of terms of queries issued to the voice interface system, terms of commands issued to the voice interface system, or phonemes thereof.

8. The method of claim 1, wherein the most frequently occurring terms are selected from one or more of terms of queries issued to the voice interface system, terms of commands issued to the voice interface system, or phonetic neighbors thereof.

9. The method of claim 1, wherein at least one of the terms of queries or the terms of commands comprise one or more of names of consumer goods, tasks, reminders, calendar items, dates, or items of a list of items.

10. A system for determining hint words for automated speech recognition, the method comprising:
a storage device; and
processing circuitry configured to:
determine a first set of terms comprising terms that are most frequently occurring terms from operation of a voice interface system, the most frequently occurring terms selected from one or more of terms of queries issued to the voice interface system, or terms of commands issued to the voice interface system;

determine a second set of terms that are most frequently occurring terms arising during a predetermined time period of operation of the voice interface system;

select as a first set of hint words facilitating operation of an automated speech recognition application, the first set of hint words comprising common terms of the first set of terms and the second set of terms; and select, if less than a predetermined number of common terms are selected, a second set of hint words comprising a plurality of terms from the first set of terms that are not among the common terms; and input/output circuitry configured to:
transmit the first set of hint words and the second set of hint words to the automated speech recognition application.

11. The system of claim 10, wherein the selecting further comprises selecting a predetermined number of the most frequently occurring ones of the terms as the hint words.

12. The system of claim 10, wherein the second set of hint words further comprises a first predetermined number of the first set of terms and a second predetermined number of the second set of terms.

13. The system of claim 10,
wherein a sum of the number of first hint words and a number of the second hint words is equal to the predetermined number.

14. The system of claim 10,
wherein the second hint words further comprises one or more terms from the second set of terms that are not among the common terms and
wherein a sum of the number of first hint words and a number of the second hint words is equal to the predetermined number.

15. The system of claim 10, wherein the most frequently occurring terms are selected from one or more of terms of most recent queries issued to the voice interface system, or terms of most recent commands issued to the voice interface system.

16. The system of claim 10, wherein the most frequently occurring terms are selected from one or more of terms of queries issued to the voice interface system, terms of commands issued to the voice interface system, or phonemes thereof.

17. The system of claim 10, wherein the most frequently occurring terms are selected from one or more of terms of queries issued to the voice interface system, terms of commands issued to the voice interface system, or phonetic neighbors thereof.

18. The system of claim 10, wherein at least one of the terms of queries or the terms of commands comprise one or more of names of consumer goods, tasks, reminders, calendar items, dates, or items of a list of items.

19. A method of determining hint words for automated speech recognition, the method comprising:
determining, using processing circuitry, a first set of terms comprising most frequently occurring terms selected from one or more of terms of queries issued to a voice interface system or terms of commands issued to the voice interface system;

determining, using the processing circuitry, a second set of terms that are most frequently occurring terms arising during a predetermined time period of operation of the voice interface system;

selecting as a first set of hint words facilitating operation of an automated speech recognition application, the first set of hint words comprising common terms of the first set of terms and the second set of terms;

selecting a second set of hint words comprising a plurality of terms from that are not among the common terms from at least one of the first set of terms or the second set of terms; and transmitting, using the processing circuitry, the hint words to the automated speech recognition application, the hint words comprising the first set of hint words and the second set of hint words.

\* \* \* \* \*